(12) United States Patent
Chen et al.

(10) Patent No.: US 7,924,269 B2
(45) Date of Patent: Apr. 12, 2011

(54) DISPLAY DEVICES AND METHODS FORMING THE SAME

(75) Inventors: Din-Guo Chen, Taipei (TW); Ying-Chih Lee, Shengang Township (TW); Shyuan-Jeng Ho, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 1494 days.

(21) Appl. No.: 11/311,986

(22) Filed: Dec. 20, 2005

(65) Prior Publication Data

US 2006/0146033 A1    Jul. 6, 2006

Related U.S. Application Data

(60) Provisional application No. 60/641,285, filed on Jan. 4, 2005.

(51) Int. Cl.
*G09G 5/00* (2006.01)

(52) U.S. Cl. .................. 345/173; 345/157; 178/18.01

(58) Field of Classification Search .............. 345/173, 345/156, 157, 158; 178/18.01, 19.01; 235/462.42, 235/462.45, 462.46; 715/856, 859
See application file for complete search history.

(56) References Cited

U.S. PATENT DOCUMENTS

| | | | | |
|---|---|---|---|---|
| 5,644,653 A * | 7/1997 | Sunakawa et al. | | 382/187 |
| 5,670,755 A | 9/1997 | Kwon | | |
| 5,821,916 A * | 10/1998 | Watson et al. | | 345/673 |
| 6,285,417 B1 | 9/2001 | Ahn et al. | | |
| 6,388,729 B2 * | 5/2002 | Ahn et al. | | 349/190 |
| 6,661,399 B1 | 12/2003 | Oh et al. | | |
| 7,196,695 B2 * | 3/2007 | Lin | | 345/173 |
| 7,292,229 B2 | 11/2007 | Morag et al. | | |
| 7,298,367 B2 * | 11/2007 | Geaghan et al. | | 345/180 |
| 2005/0133279 A1 | 6/2005 | Thacker | | |

FOREIGN PATENT DOCUMENTS

| | | |
|---|---|---|
| CN | 1286424 | 3/2001 |
| CN | 1534333 | 10/2004 |
| JP | 7-13710 | 1/1995 |
| JP | 7-200177 | 8/1995 |
| JP | 09-080467 | 3/1997 |
| JP | 09-258893 | 10/1997 |
| JP | 11-271712 | 10/1999 |
| JP | 2001-183630 | 7/2001 |
| JP | 2003-196023 | 7/2003 |
| JP | 2004-215057 | 7/2004 |

* cited by examiner

*Primary Examiner* — Abbas I. Abdulselam
(74) *Attorney, Agent, or Firm* — Liu & Liu (57) ABSTRACT

Display devices and methods forming the same. A digitizer sensor board is integrated on an upper substrate or a lower substrate of a display panel to provide a display device. In the display device, the display panel displays images, and the digitizer sensor board is integrated into the display panel to sense position of a position pointer or finger contact on a surface.

29 Claims, 8 Drawing Sheets

DISPLAY DEVICES AND METHODS FORMING THE SAME

BACKGROUND

The invention relates to display devices, and more particularly, to display systems with digitizers.

Many types of touch sensitive computer input devices are currently touched on or in conjunction with computer displays. Such devices detect the position of a position pointer or finger contact on the sensor surface. The position coordinates are generated for interaction with the computer, for example in selecting icons on the display, menu items, editing images, or feedback for input of hand-drawn characters and graphics.

Numbers of technologies can be used for such devices, including capacitive sensing, resistive sensing using a conductive overlay sheet, infrared sensing, acoustic wave sensing, and piezoelectric force sensing. One of such device like digitizers which use hardwired handheld position pointer such as pens typically use electromagnetic, electrostatic, resistive, or sonic pulse sensing.

These input devices responsive to human contact are typically used for cursor control, such as selection of display icons and menu items. Other input devices responsive to position pointer (usually a hardwired pen) are used to create or trace drawings, blueprints, or original art. These devices are also used for character or handwriting recognition. It is therefore desirable that the sensor reproduce the path of the position pointer by some visual means to provide visual feedback.

Some of these input devices are responsive to both user and position pointer contact, thereby providing the convenience of position pointer-based input, for example when writing on the screen, as well as the ease of touch input, which does not require position pointer.

Figure 1:
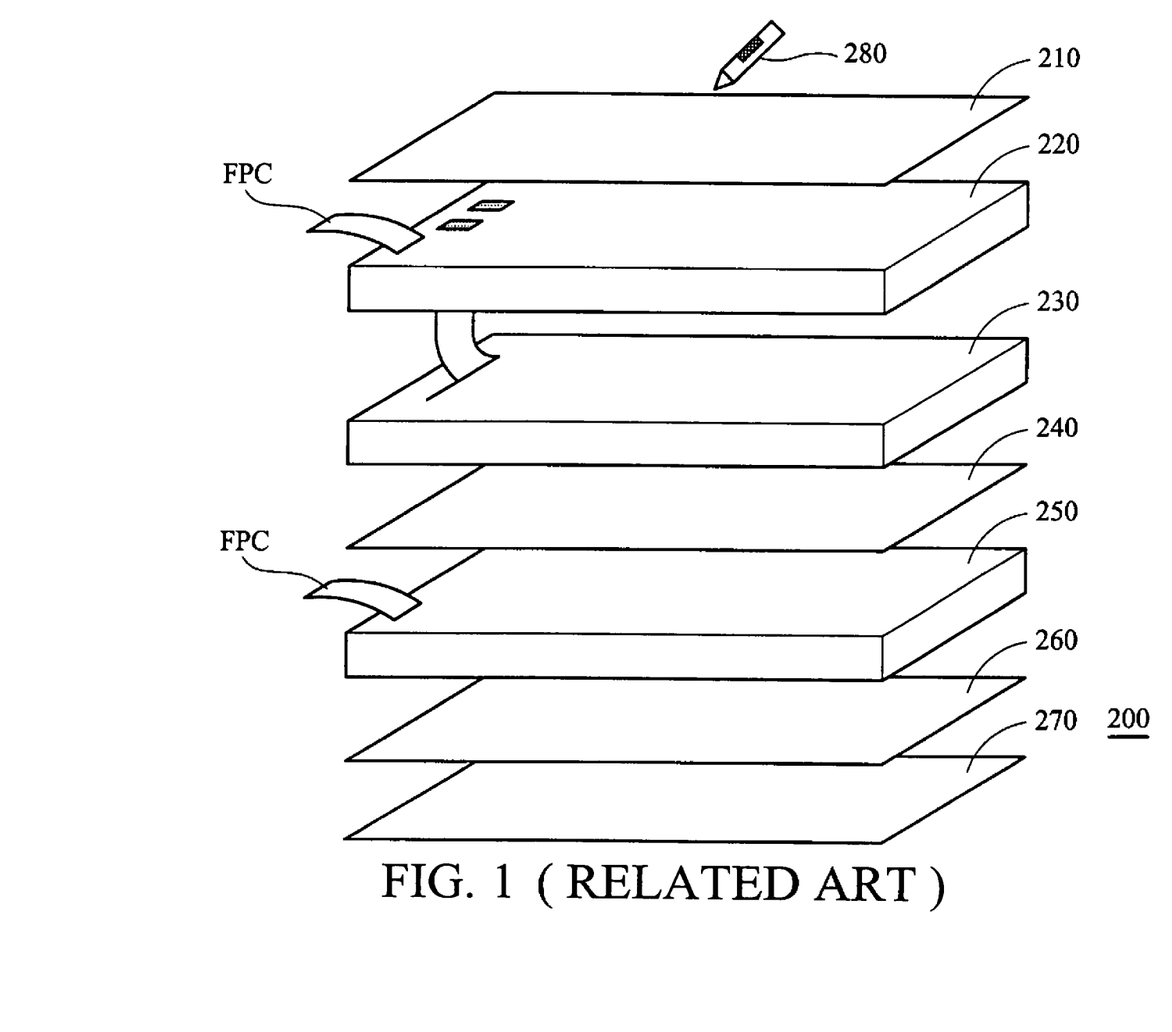
FIG. 1 is a structural diagram of a conventional display device with digitizer sensor board.
Figure 2:
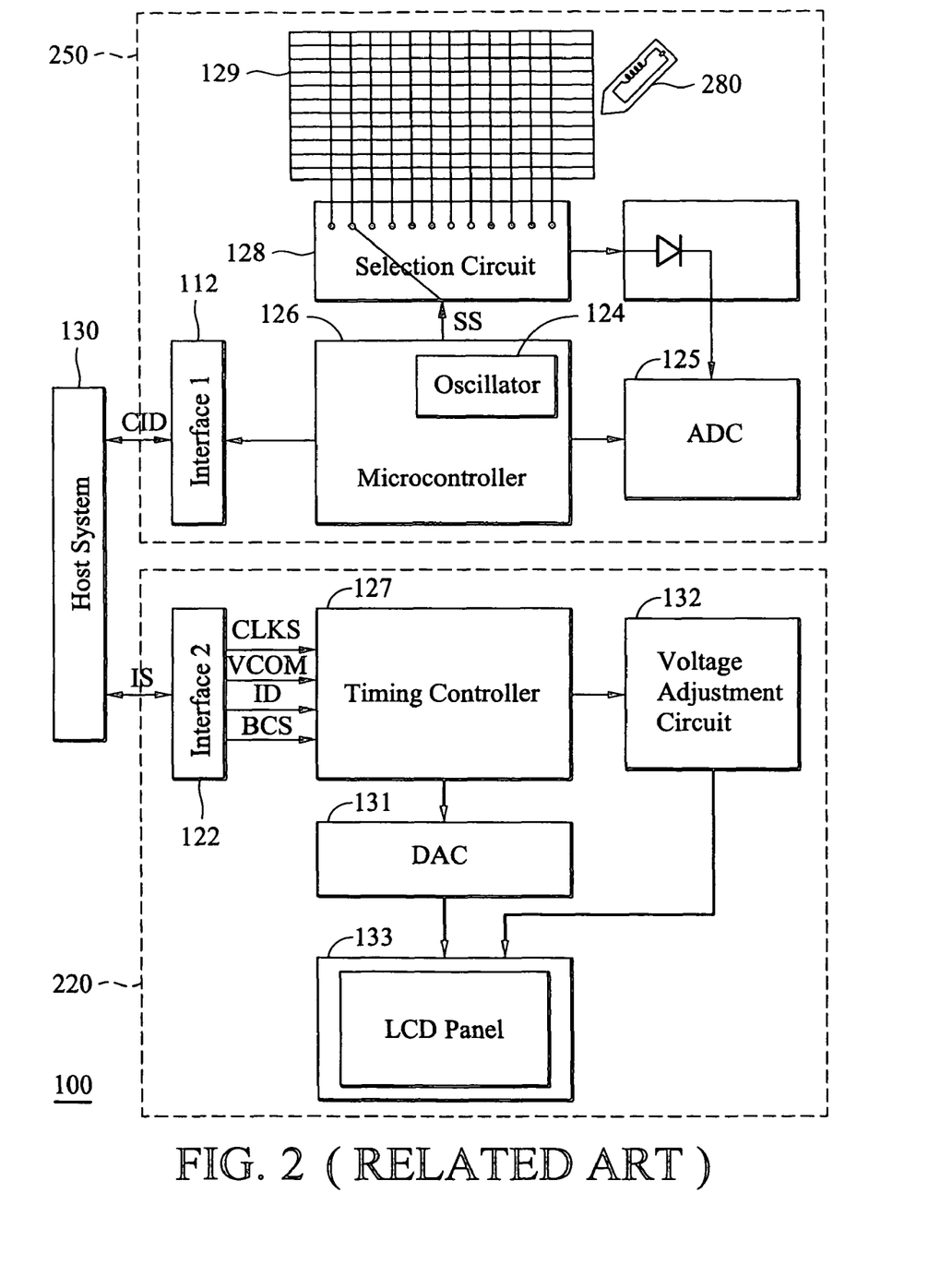
FIG. 2 is a block diagram of a conventional display system with a digitizer.

FIG. 1 is a structural diagram of a conventional display device with a digitizer. As shown, the display device 200 comprises a top glass cover 210, liquid crystal display (LCD) panel 220, a backlighting module 230, a reflector 240, digitizer sensor board 250, a shield film 260, a back frame 270 and a position pointer 280. The top glass cover 210, the LCD panel 220, the backlighting module 230, the reflector 240, the digitizer sensor board 250, the shield film 260 and the back frame 270 are assembled as a laminated construction. The LCD panel 220 and the digitizer sensor board 250 are coupled to an external host system via differential interfaces, such as two flexible printed circuit boards (FPCs). FIG. 2 is a block diagram of a conventional display system with a digitizer. As shown, display system 100 comprises LCD module 220 and digitizer module 250. The LCD module 220 and the digitizer module 250 are coupled to the host system 130 via corresponding interfaces 112 and 122 respectively. The digitizer module 250 requires an oscillator 124 disposed in the microcontroller 126 to generate scan timing signals (SS) for the selection circuit 128, thereby performing scan operation of sensor array 129. Because the reflector, the digitizer sensor board, a shield film and a back frame in the conventional display system are separate components and the LCD module and the digitizer module require differential interfaces coupled to an external host system, the conventional display system presents increased costs, thickness, and weight.

SUMMARY

The invention is directed to provide a display device that integrates a digitizer sensor board on a LCD module so as to lower thickness and weight.

In one aspect of the invention, a LCD module displays image, and a digitizer sensor board integrated on the surface of the substrate of the LCD module senses position of a position pointer or finger contact on a surface.

In a further aspect, the invention discloses an embodiment of a display system, in which the disclosed display device displays images and senses position of a position pointer or finger contact on a surface, and with a shield film laminate on the display system to screen external noise.

In another aspect, the invention discloses an embodiment of an electronic device, in which the disclosed display system displays images and senses position of a position pointer or finger contact on a surface, and a DC/DC converter is operatively coupled to the display system, powering the display system to display images and sense position of a position pointer or finger contact on a surface.

In another aspect, the invention discloses an embodiment of a fabrication method of a display device, in which a digitizer sensor board is formed on a glass substrate to serve as an upper substrate of a display device. A thin film transistor (TFT) array substrate is formed on lower substrate of the display device. The upper substrate and the lower substrate of the display device are assembled.

In a further aspect, the invention discloses an embodiment of another fabrication method of a display device, in which a digitizer sensor board is formed on a glass substrate. A thin film transistor (TFT) array is formed on the digitizer sensor board, such that the TFT array and the digitizer sensor board on the glass substrate serve as a lower substrate of a LCD module. An upper substrate of the LCD module is formed and the upper substrate and the lower substrate of the LCD module are assembled.

DESCRIPTION OF THE DRAWINGS

The invention can be more fully understood by the subsequent detailed description and examples with reference made to the accompanying drawings, wherein.

DETAILED DESCRIPTION

Figure 3A:
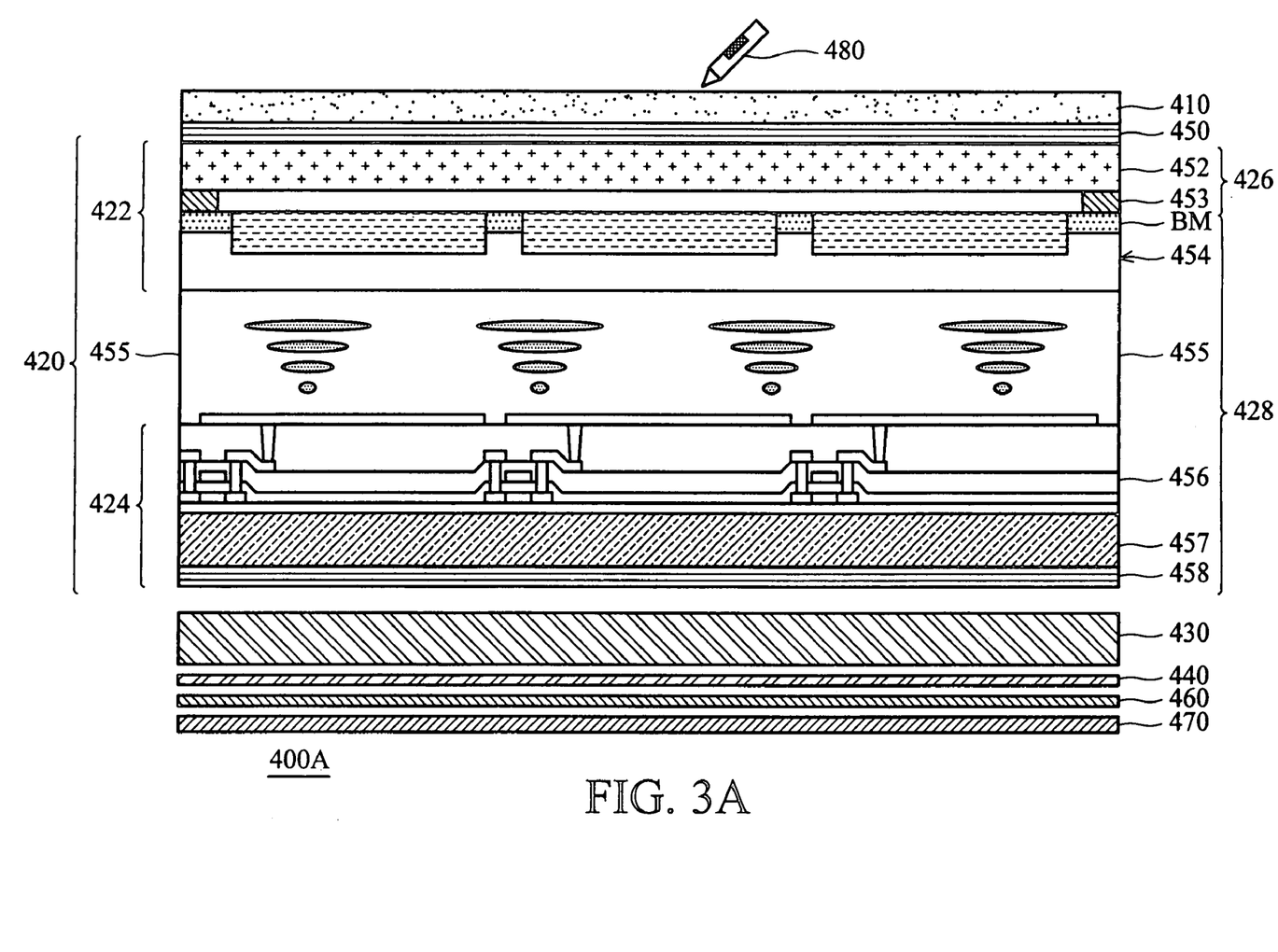
FIG. 3A shows a first embodiment of a display device.

FIG. 3A shows a first embodiment of a display device. As shown, the display device 400A comprises a top glass cover 410, a display panel 420, a backlight module 430, a reflector 440, a shield film 460 and a back frame 470. The top glass cover 410, the backlight module 430, the reflector 440, the shield film 460 and the back frame 470 are laminated with the display panel 420 in the display device 400A. In this embodiment, the LCD module 428 is not limited to LCD. The display panel 420 comprises a LCD display module 428 and a digitizer sensor film 453 integrated on a surface of a glass substrate 452 of the LCD module 428.

The LCD module 428 comprises an upper substrate 422, a lower substrate 424, and a liquid crystal layer 455, in which the upper substrate 422 comprises a color filter layer 454, a digitizer sensor board 426, and a polarizer 450 and the lower substrate 424 comprises a thin film transistor (TFT) array 456, a glass substrate 457 and a polarizer 458. Typically, the color filter layer 454 comprises a black matrix (BM) and a plurality of color coated films (CCF) formed therein, the black matrix BM resulting in a non-transparent area in the LCD module 428. The LCD module 428 also can be an organic light-emitting diode (OLED) display module or a field emission display (FED) module, although it is to be understood that the invention is not limited thereto. In some display systems, the backlight module 430, the reflector 440 or the color filter 454 can be omitted.

The digitizer sensor board 426 comprises a glass substrate 452 and a digitizer sensor film 453 formed thereon, with the digitizer sensor board 426 integrated with the color filter layer 454 of the LCD module 428. The digitizer sensor board 426 can be a capacitive digitizer sensor board, a resistive digitizer sensor board, an infrared digitizer sensor board, an acoustic wave digitizer sensor board, a piezoelectric force digitizer sensor board, an electrostatic digitizer sensor board or a sonic pulse digitizer sensor board.

For example, the digitizer sensor film 453 can comprise a sensor array, metal coils, metal grids or conductor wires formed on the glass substrate 452, in which in the sensor array, metal coils, metal grids or conductor are formed in the non-transparent area, thereby avoiding decrease in aperture ratio of the display panel. In some examples, the sensor array, metal coils, metal grids or conductive wires can be printed on the bottom surface of the glass substrate 452 by screen-printing, ink-jet printing or deposition. For example, conductive metal pastes or inks, such as Ag or Cu based formulations, can be used for screen-printing or ink-jet printing.

Figure 3B:
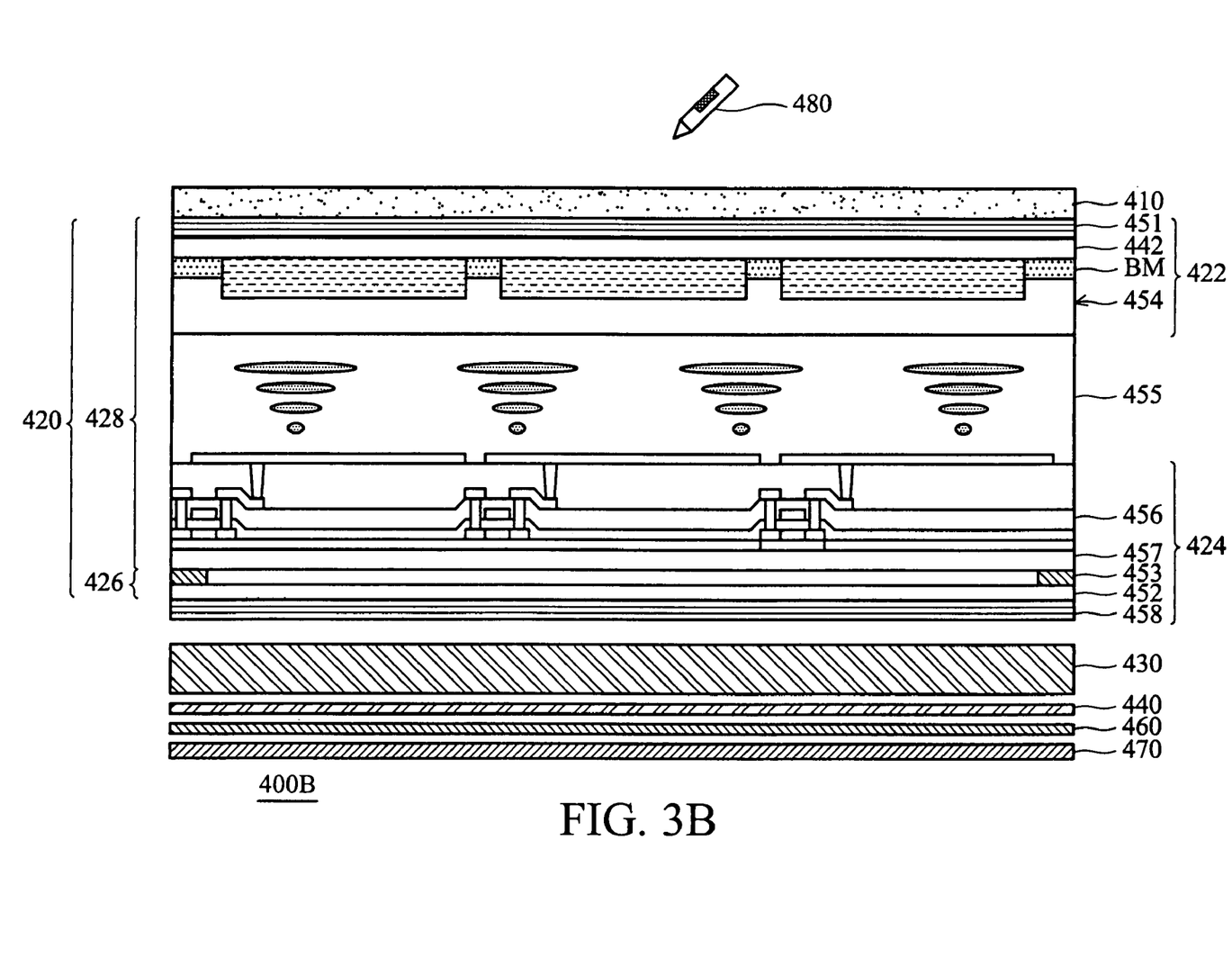
FIG. 3B shows a second embodiment of a display device.

FIG. 3B shows a second embodiment of a display device. The display device 400B comprises a top glass cover 410, a display panel 420, a backlight module 430, a reflector 440, a shield film 460 and a back frame 470. As shown, unlike the first embodiment, the digital sensor board 426 is integrated on the lower substrate of the LCD module 428.

The LCD module 428 comprises an upper substrate 422 with a color filter layer 454 and a glass substrate 442, a lower substrate 424, and a liquid crystal layer 455 formed between the upper substrate and the lower substrate. The lower substrate 424 comprises a thin film transistor (TFT) array 456, a $SiO_2$ layer 457 and a polarizer 458. The LCD module 428 can also be an organic light-emitting diode (OLED) display module or a field emission display (FED) module, although it is to be understood that the invention is not limited thereto. In some display systems, the backlight module 430, the reflector 440 or the color filter layer 454 can be omitted.

The digitizer sensor board 426 comprises a glass substrate 452 and a digitizer sensor film 453 formed thereon. The digitizer sensor board 426 is integrated on the lower substrate of LCD module 428.

The present invention also discloses a fabrication method for a display panel 420. In this method, a digitizer sensor film is formed on a glass substrate to serve as an upper substrate of a display panel. For example, the digitizer sensor film 453 can be formed on the glass substrate 452 and the color filter 454 is then formed on the digitizer sensor film 453, as shown in FIG. 3A. A polarizer 458 is formed on the glass substrate 452, and a dielectric layer is formed between the color filter 454 and the digitizer sensor film 453 if needed. The digitizer sensor board 426 comprises the digitizer sensor film 453 and the glass substrate 452. Namely, the digitizer sensor board 426 is integrated on the upper substrate of the LCD module 428.

A thin film transistor (TFT) array substrate is formed to serve as a lower substrate of the display panel. For example, the TFT array 456 is formed on the glass substrate 457 to serve as a lower substrate 424 of the display panel 428, in which a polarizer 458 is formed on the glass substrate 457 if needed.

The upper substrate and the lower substrate of the LCD module 428 are assembled into a display panel 420. The LCD module 428 can also be an organic light-emitting diode (OLED) display module or a field emission display (FED) module, although it is to be understood that the invention is not limited thereto.

Liquid crystal material is injected between the upper substrate and the lower substrate to form a liquid crystal layer 455 after the upper substrate and the lower substrate are assembled.

The invention also discloses another fabrication method for a display panel. In this method, a digitizer sensor board is formed on a glass substrate and a TFT array 456 is formed on the digitizer sensor board. For example, the digitizer sensor film 453 can be formed on the glass substrate 452, a $SiO_2$ layer 457 can be formed on the digitizer sensor film 453 and a thin film transistor (TFT) array 456 can be formed on the $SiO_2$ layer 457, as shown in FIG. 3B, in which a polarizer 458 is formed on the glass substrate 452 if needed. The digitizer sensor board 426, the $SiO_2$ layer 457 and the TFT array 456 serve as the lower substrate of the display panel 428. Namely, the digitizer sensor board 426 is integrated on the lower substrate of the display panel 420.

An upper substrate of the LCD module 428 is formed. For example, the color filter 454 laminated with the polarizer 451 can serve as the upper substrate of the display panel, as shown in FIG. 3B.

The upper substrate and the lower substrate of the LCD module 428 are assembled to a display panel 420. The LCD module 428 can be a liquid crystal display (LCD) module, an organic light-emitting diode (OLED) display module or a field emission display (FED) module, although it is to be understood that the invention is not limited thereto.

Because the LCD module 428 shown in FIG. 3B is an LCD module, liquid crystal material is injected between the upper substrate and the lower substrate to from a liquid crystal layer 455 after the upper substrate and the lower substrate are assembled.

Figure 4:
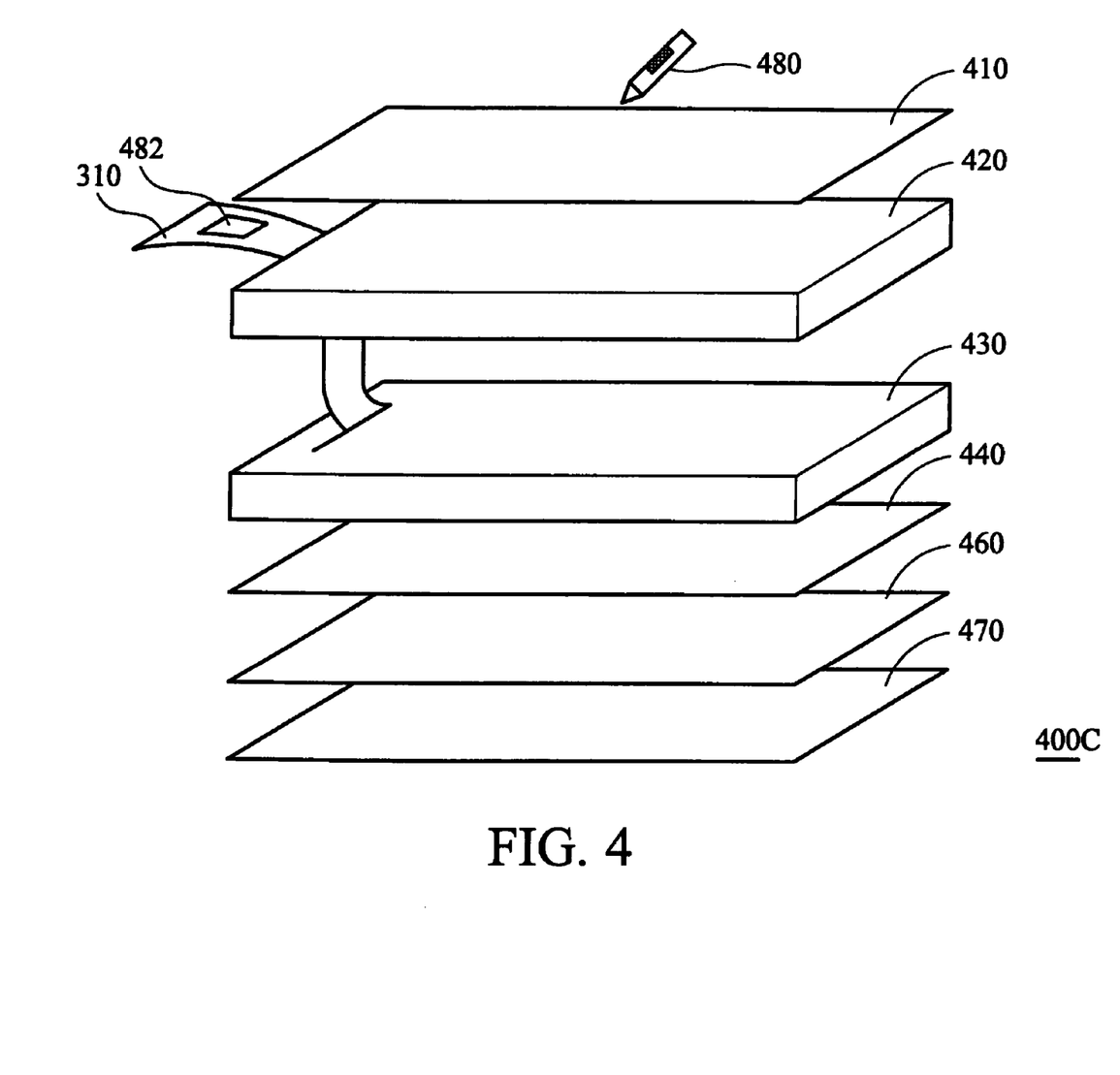
FIG. 4 is a block diagram of a display device according to the invention.

FIG. 4 shows an embodiment of a display device. As shown, the display device 400C comprises a top glass cover 410, a display panel 420, a backlighting module 430, a reflector 440, a shield board 460 and a back frame 470. The display panel 420 is coupled to an external host system via a single interface 310, such as a flexible printed circuit board (FPC). The display panel 420 comprises a display module and a digitizer sensor board integrated in the display module. A control unit 482 is mounted on the flexible printed circuit board to drive the display module and generate a scan timing signal SS to the digitizer sensor board according to an image signal from the host system via the interface. The display panel 420 executes a scan operation to generate position data in response to the scan timing signal, the control unit 482 determines the corresponding coordinate data of the position pointer 480 according to the position data for output to the host system. The control unit 482 can also, for example, be a chip on glass of the LCD module 428.

In embodiments of the invention, the LCD module 428 can also be a liquid crystal display (LCD) module, an organic light-emitting diode (OLED) module, or a field emission display (FED) module, but it is to be understood that the invention is not limited thereto.

The digitizer sensor board 426 in the display panel 420 can be a capacitive sensing digitizer board, a resistive sensing digitizer board, an infrared sensing digitizer board, an acoustic wave sensing digitizer board, or a piezoelectric force sensing digitizer board, an electrostatic sensing digitizer board, or a sonic pulse sensing digitizer board.

Because the display system of the embodiment of the invention requires only a display panel integrated with a display module and a digitizer sensor board, thickness and weight are less than a conventional display system with separate components.

Figure 5:
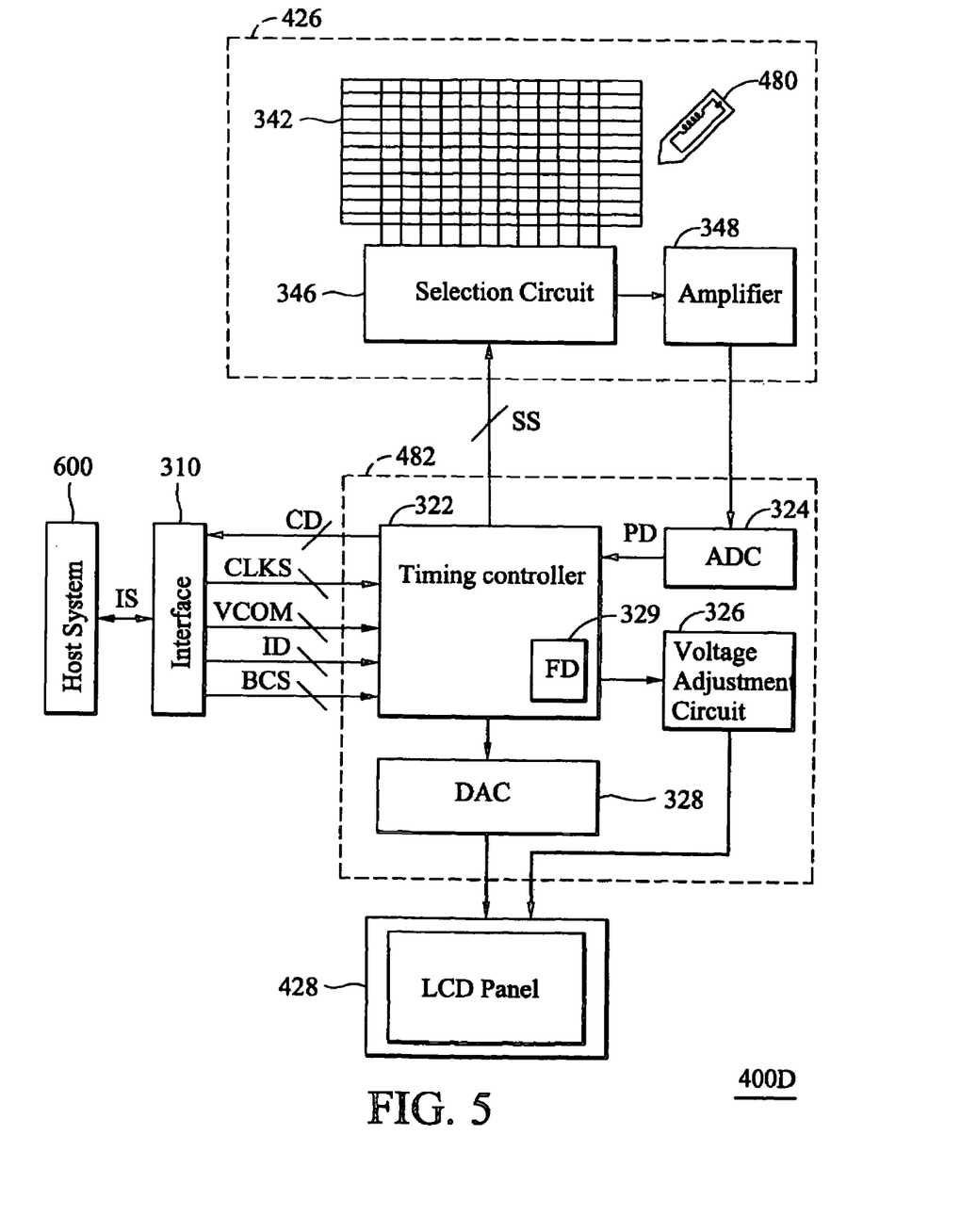
FIG. 5 is a block diagram of an embodiment of a display system.

FIG. 5 is a block diagram of an embodiment of a display system. The display system 400D comprises an interface 310, the control unit 482, the described digitizer module 426 and the described LCD module 428.

The interface 310 is coupled between the host system 600 and the control unit 482, to exchange data with the host system 600.

The control unit 482 is coupled to the interface 310, the LCD module 428 and the digitizer module 426. The control unit 482 drives the LCD module 428 and generates a scan timing signal (SS) to the digitizer module 426 according to an image signal (IS) from the host system 600 via the interface 310. The control unit 482 comprises a timing controller 322, an analog-to-digital converter 324, a voltage adjustment circuit 326 and a digital-to-analog converter (DAC) 328. The control unit 482 also receives bus control signals (BCS) from the host system 600 via the interface 310, controlling the operations of the ADC 324, DAC 328 and the selection circuit 346.

The timing controller 322 is coupled to the interface 310, the LCD module 428 and the digitizer module 426, generating a driving signal by the DAC 328 according to the image signal (IS) from the host system 600. Typically, the image signal (IS) from the host system comprises image data (ID), a clock signal (CLKS) and common voltage Vcom, in which the clock signal CLKS includes a vertical scan signal Vs, a horizontal scan signal Hs, a data enable signal DE and a system clock CLK. The timing controller 322, according to the clock signal CLKS of the image signal, provides reference timing signals comprising a vertical clock output CKV, a horizontal clock output CKH, a horizontal enable output ENBH, a vertical enable output ENBV, a horizontal scan direction CSH and a vertical scan direction CSV, for the LCD module 428. The reference timing signal RTS and the image data ID serve as the driving signal and are output to the DAC 328 for conversion to analog signals driving the LCD module 428. The voltage adjustment circuit 326 is coupled to the timing controller 322 and the LCD module 428, adjusting the voltage level of the analog signal driving the LCD module 428 according to the common voltage Vcom.

Further, timing controller 322 generates the scan timing signal SS to the digitizer module 426 according to the image signal (IS) from the host system 600. Because the frequency of scan timing signal (SS) required in the digitizer module 426 is between about 100 KHz and 300 KHz and the frequency of the clock signal CLKS in the image signal IS from the host system is typically between 5 MHz and 6 MHz, the embodiment down-converts the clock signal CLKS in the image signal from the host system to obtain a scan timing signal SS with a suitable frequency without utilizing an oscillator as a conventional digitizer board. Thus, in this embodiment, the digitizer module 426 and the LCD 428 are coupled to the host system 600 via a single interface. In this embodiment, timing controller 322 comprises a frequency divider 329 to convert the clock signal CLKS of the image signal IS to the scan timing signal SS at a frequency suitable for the digitizer module 426.

The LCD module 428 is coupled to the control unit 482 to display images according to the analog signals from the DAC 328. The LCD module 428 can also be an organic light-emitting diode (OLED) display module, or a field emission display (FED) module.

The digitizer module 426 is typically used for cursor control applications, such as selection of displayed icons and menu items, creating or tracing drawings or blueprints, or for character or handwriting recognition. In this embodiment, the digitizer module 426 is coupled to the host system 600 via the interface 310 and executes a scan operation to generate position data PD in response to the scan timing signal SS. The digitizer module 426 comprises a digitizer sensor array 342, a selection circuit 346, and an amplifier 348. In some examples, the digitizer sensor array 342, the selection circuit 346 and the amplifier 348 are formed on the flexible digitizer sensor film 442 shown in FIG. 3. Alternately, the selection circuit 346 and the amplifier 348 can be integrated to the control unit 482 (not shown). For example, the digitizer module 426 can be an electromagnetic sensing digitizer board, in which electromagnetic signals are transmitted from the position pointer 480 and sensed by the sensor array 342.

The digitizer sensor array 342, for example, comprises metal coil grids in both X and Y orientations, sensing the position of the position pointer. The position pointer transmits signals to the digitizer sensor array 342, and the selection circuit 346 scans the coils in the sensor array 342 according to the scan timing signal SS from the control unit 482, such that signals induced in the digitizer sensor array 342 are sent to the amplifier 348, and the amplifier 348 amplifies the induced signals in the digitizer sensor array 342.

The amplified signals from the amplifier 348 are output to the ADC 324 and converted to position data PD to and then to the timing controller 322. The timing controller 322 receives the position data PD relative to the position pointer 344 and determines the corresponding coordinate data CD of the digitizer sensor array 342 accordingly. The corresponding coordinate data CD of the digitizer sensor array 342 is then output to the host system 600 via the interface 310. For example, the control unit 482 can be a single chip integrated by the timing controller 322, the ADC 324, the voltage adjustment circuit 326, and the DAC 328. The control unit 320 can be mounted directly on the display module 428 by chip on glass (SOG) process or mounted on a flexible printed circuit board (FPC) of the display module 428.

Figure 6:
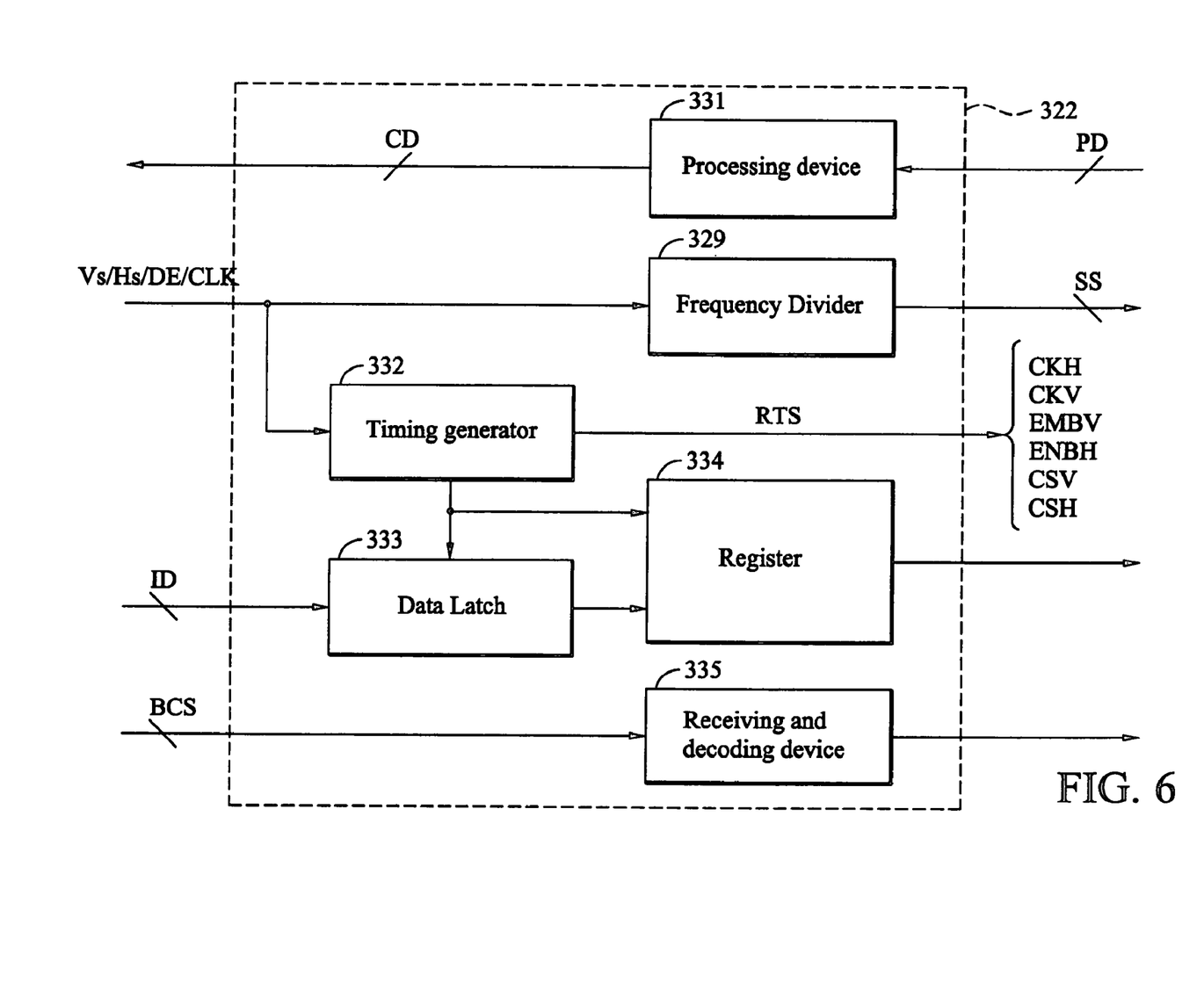
FIG. 6 shows an embodiment of a timing controller.

FIG. 6 shows an embodiment of a timing controller. The timing controller 322 comprises a processing device 311, a frequency divider (FD) 329, a timing generator 332, a data latch 333, a register 334, and a receiving and decoding device 335, and receives the image signal IS and bus control signal BCS from the host system 600 via the interface 310.

The processing device 311 is coupled to the ADC 324 to receive the position data PD and calculate the corresponding coordinate data CD for output to the host system 600 via the interface 310. The host system 600 receives the coordinate data DC and converts to image signal to display on the display module. The frequency divider 329 converts the clock signal CLKS of the image signal to the scan timing signal SS with a suitable frequency, such as 100 KHz~300 KHz, for the digitizer sensor board 426.

The timing generator 332 also receives the clock signal CLKS to provide reference timing signals RTS for the display module 322. The image data ID in the image signal from the host system 600 is temporarily stored by the data latch 333 and the register 334 and output to the DAC 328 to drive the display module 428. The receiving and decoding device 335 receives the bus control signal BCS from the host system 600 to generate control data controlling operations of the DAC 328, the ADC 324 and the selection circuit 346.

Thus, the invention can use a single interface and integrate microprocessor 126 and the ADC 125 for digitizer sensor board and timing controller 127, voltage adjustment circuit 132, the DAC 131 for the LCD module shown in FIG. 1 into single control unit, such that cost, thickness and weight of the display system are be reduced.

Figure 7:
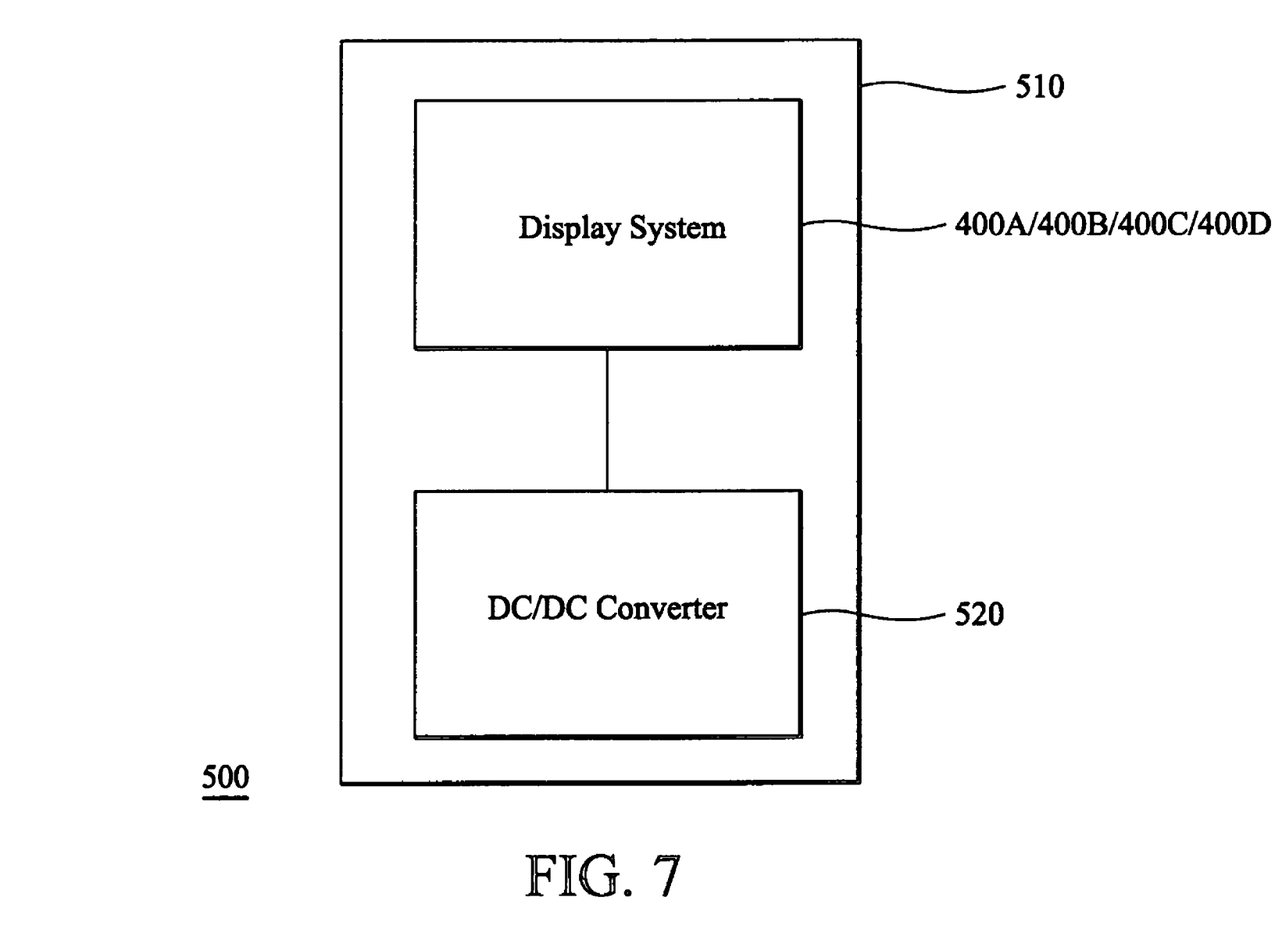
FIG. 7 schematically shows an electronic device incorporating a display system in accordance with embodiments of the present invention.

FIG. 7 schematically shows an electronic device 500 deploying the disclosed display systems. The display device 400A/400B/400C/400D can be a liquid crystal display system, an organic light-emitting diode (OLED) display system, or a field emission display (FED) system, although it is to be understood that the invention is not limited thereto. The electronic device 500 may be a portable device such as a PDA, notebook computer, tablet computer, cellular phone, or a display monitor device, etc. Generally, the electronic device 500 includes a housing 510, the display system 400A/400B/400C/400D shown in FIG. 4, a DC/DC converter 520, etc. Further, the DC/DC converter 520 is operatively coupled to the display system 400A/400B/400C/400D and provides an output voltage powering the display system 400A/400B/400C/400D to display images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a display panel, wherein the display panel comprises an upper substrate having a color filter and a lower substrate having a thin film transistor (TFT) array;
   a digitizer sensor film integrated in the display panel for sensing position of a position pointer on a surface of the display panel; and
   a control unit coupled to the display panel and the digitizer sensor film according to an image signal from a host system via an interface, driving the display panel and generating a scan timing signal to the digitizer sensor film,
   wherein the display panel further comprises a non-transparent area generated by a black matrix in the color filter, in the top substrate, and coils and conductor wires in the digitizer sensor film are formed in the non-transparent area.

2. The display device as claimed in claim 1, wherein the digitizer sensor film is located between the upper substrate and the lower substrate.

3. The display device as claimed in claim 1, wherein the digitizer sensor film is integrated between the color filter and the upper substrate.

4. The display device as claimed in claim 1, wherein the digitizer sensor film is integrated between the TFT array and the lower substrate.

5. A display system, comprising:
   a display device as claimed in claim 1.

6. The display system as claimed in claim 5, wherein the digitizer sensor film executes a sensing operation to detect the position of a position pointer or finger contact on the surface in response to the scan timing signal.

7. The display system as claimed in claim 5, wherein the image signal comprises image data and a clock signal, and the control unit generates the scan timing signal according to the clock signal.

8. The display system as claimed in claim 5, wherein the control unit is a chip on glass (COG) on the display module.

9. The display system as claimed in claim 5, the control unit is mounted on a flexible printed circuit board (FPC) coupled to the display panel.

10. The display system as claimed in claim 5, wherein the display panel is a liquid crystal display (LCD) module, an organic light-emitting diode (OLED) display module or a field emission display (FED) module.

11. The display system as claimed in claim 5, wherein the digitizer sensor film is a capacitive sensing digitizer module, a resistive sensing digitizer module, an acoustic wave sensing digitizer module, a piezoelectric force sensing digitizer module, an electrostatic sensing digitizer module, or a sonic pulse sensing digitizer module.

12. The display system as claimed in claim 5, further comprising:
   a shield film laminated with the display panel to screen external noise.

13. The display system as claimed in claim 12, further comprising a backlight device coupled to the display panel.

14. The display system as claimed in claim 12, further comprising a reflector laminated with the display panel to reflect light.

15. An electronic device, comprising:
   a display system as claimed in claim 5; and
   a DC/DC converter operatively coupled to the display system, powering the display system to display images and sense position of a position pointer or finger contact on a surface.

16. The electronic device as claimed in claim 15, wherein the electronic device is a display monitor, a notebook computer, a tablet computer, a cellular phone or a personal digital assistant (PDA).

17. A fabrication method of a display panel, comprising:
   forming a digitizer sensor film on a glass substrate to serve as an upper substrate of the display panel, wherein the upper substrate includes a color filter and a black matrix, wherein a non-transparent area is generated by the black matrix, and coils and conductor wires in the digitizer sensor film are formed in the non-transparent area;
   forming a thin film transistor (TFT) array to serve as a lower substrate of the display panel;
   assembling the upper substrate and the lower substrate of the display panel; and
   providing a control unit coupled to the display panel and the digitizer sensor film according to an image signal from a host system via an interface, driving the display panel and generating a scan timing signal to the digitizer sensor film.

18. The fabrication method as claimed in claim 17, further comprising forming a color filter on the digitizer sensor film of the upper substrate.

19. The fabrication method as claimed in claim 18, further comprising injecting liquid crystal material between the upper substrate and the lower substrate.

20. The fabrication method as claimed in claim 19, wherein the display panel is a liquid crystal display (LCD) panel.

21. The fabrication method as claimed in claim 17, wherein the display panel is an organic light-emitting diode (OLED) display panel or a field emission display (FED) panel.

22. The fabrication method as claimed in claim 17, wherein the digitizer sensor film is a capacitive sensing digitizer film, a resistive sensing digitizer film, an acoustic wave sensing digitizer film, a piezoelectric force sensing digitizer film, an electrostatic sensing digitizer film, or a sonic pulse sensing digitizer film.

23. The fabrication method as claimed in claim 17, wherein the digitizer sensor film is located between the upper substrate and the lower substrate.

24. A fabrication method of a display panel, comprising:
forming a digitizer sensor film on a glass substrate;
forming a thin film transistor (TFT) array on the digitizer sensor film, such that the TFT array and the digitizer sensor film on the glass substrate serve as a lower substrate of a display panel;
forming an upper substrate of the display panel;
assembling the upper substrate and the lower substrate of the display panel, wherein the digitizer sensor film is located between the upper substrate and the lower substrate; and
providing a control unit coupled to the display module and the digitizer sensor film according to an image signal from a host system via an interface, driving the display panel and generating a scan timing signal to the digitizer sensor film.

25. The fabrication method as claimed in claim 24, further comprising forming a color filter on the upper substrate.

26. The fabrication method as claimed in claim 25, further comprising injecting liquid crystal material between the upper substrate and the lower substrate.

27. The fabrication method as claimed in claim 26, wherein the display panel is a liquid crystal display (LCD) panel.

28. The fabrication method as claimed in claim 24, wherein the display panel is an organic light-emitting diode (OLED) display panel or a field emission display (FED) panel.

29. The fabrication method as claimed in claim 24, wherein the digitizer sensor film is a capacitive sensing digitizer film, a resistive sensing digitizer film, an acoustic wave sensing digitizer film, a piezoelectric force sensing digitizer film, an electrostatic sensing digitizer film, or a sonic pulse sensing digitizer film.

* * * * *